(12) United States Patent
Kakaiya et al.

(10) Patent No.: US 11,740,931 B2
(45) Date of Patent: Aug. 29, 2023

(54) PROCESSING DEVICE, CONTROL UNIT, ELECTRONIC DEVICE, METHOD FOR THE ELECTRONIC DEVICE, AND COMPUTER PROGRAM FOR THE ELECTRONIC DEVICE

(71) Applicant: Intel Corporation, Santa Clara, CA (US)

(72) Inventors: Utkarsh Y. Kakaiya, Folsom, CA (US); Ashok Raj, Portland, OR (US); Rajesh Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/651,906

(22) Filed: Feb. 22, 2022

(65) Prior Publication Data

US 2022/0350639 A1    Nov. 3, 2022

(30) Foreign Application Priority Data

Apr. 30, 2021    (DE) .......................... 102021111180.3

(51) Int. Cl.
*G06F 9/48* (2006.01)
*G06F 13/28* (2006.01)
*G06F 9/30* (2018.01)

(52) U.S. Cl.
CPC ........ *G06F 9/4812* (2013.01); *G06F 9/30101* (2013.01); *G06F 9/485* (2013.01); *G06F 13/28* (2013.01)

(58) Field of Classification Search
CPC .... G06F 9/4812; G06F 9/30101; G06F 13/28; G06F 9/485
See application file for complete search history.

(56) References Cited

U.S. PATENT DOCUMENTS

| | | | |
|---|---|---|---|
| 2012/0054750 A1* | 3/2012 | Saripalli | G06F 9/5094 718/100 |
| 2014/0047151 A1* | 2/2014 | Feehrer | G06F 9/4812 710/267 |
| 2014/0181555 A1* | 6/2014 | Bodas | G06F 1/324 713/323 |
| 2015/0286595 A1* | 10/2015 | McMenamin et al. | G06F 11/2092 710/264 |
| 2019/0121658 A1* | 4/2019 | Thiyagarajah | G06F 9/546 |

* cited by examiner

*Primary Examiner* — Zachary K Huson
(74) *Attorney, Agent, or Firm* — 2SPL Patent Attorneys PartG mbB; Kieran O'Leary

(57) ABSTRACT

A processing device is provided. The processing device comprises an interface configured to receive information about an operation state of a surrogate processor. Further, the processing device comprises a processing circuitry configured to control the interface and to decide whether an interrupt addressed to the processing circuitry is processed by the processing circuitry or redirected to the surrogate processing circuitry based on an operation state of the processing circuitry and the surrogate processing circuitry.

21 Claims, 10 Drawing Sheets

PROCESSING DEVICE, CONTROL UNIT, ELECTRONIC DEVICE, METHOD FOR THE ELECTRONIC DEVICE, AND COMPUTER PROGRAM FOR THE ELECTRONIC DEVICE

CROSS-REFERENCE TO RELATED APPLICATION

This application claims priority to German Application 10 2021 111 180.3, filed on Apr. 30, 2021. The content of this earlier filed application is incorporated by reference herein in its entirety.

FIELD

The present disclosure relates to management of processing circuitries. In particular, examples relate to processing device, control unit, electronic device, method for the electronic device and computer program for the electronic device.

BACKGROUND

Modern processors may consist of many cores in a single socket. Operating Systems (OS) try to save energy by placing cores that are not required for compute in an idle state saving power. When Hyper Threading (HT) is enabled, placing both threads in a low power state would drive the core into deeper power state depending on some statistics the hardware maintains to ensure there is enough residency before driving the cores into deep power saving states. When cores enter deep power saving states, events such as interrupts will bring them out of the idle state to prepare for working on the interrupts. Such events can incur latency due to bringing the cores out of deep idle. As a result, some of the real-time or cloud computing systems disable idle to avoid incurring that latency due to idle. Thus, a processor with improved characteristic may be desired.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
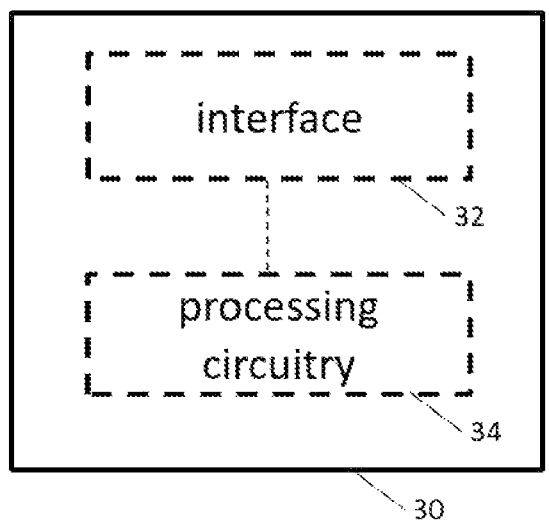
FIG. 1 shows a block diagram of an example of a processing device.

When a processing circuitry, e.g. a core of an electronic device or a thread of this core, enters a deep power saving state, events such as interrupts will bring it out of the deep power saving state to prepare for working on the interrupts. Such events can incur latency due to bringing the cores out of deep idle. There may be several processing circuitries that need to be powered up, deep power saving states to be restored before operation system (OS) interrupt code can be run on those processing circuitries.

Disabling C-states results in keeping the cores always active that increases the power footprint of the server and wastes energy when it could be saving power when there is no more work for the cores/threads to perform.

In virtualized environments, one or more virtual processors may be context switched out at the end of time-quantum (time-slice) resulting into similar latency observed for the interrupts directed to VM (on that particular VP), as this interrupt first gets dispatched to VMM and then eventually gets delivered to VP (even when posted interrupt mechanism is used). Such latencies result in significantly higher tail-latency for the Input/output (I/O) traffic in the virtualized or cloud environments, especially when the central processing unit (CPU) resources are overcommitted. Increased tail-latency for I/O traffic impacts workload execution and negatively impacts performance in the virtualized/cloud environments.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of the group A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIG. 1 shows a block diagram of an example of a processing device 30. The processing device 30 comprises an interface 32 configured to receive information about an operation state of a surrogate processing circuitry. Further the processing device 30 comprises processing circuitry 34 configured to control the interface 32 and to decide whether an interrupt addressed to the processing circuitry is processed by the processing circuitry or redirected to the surrogate processing circuitry based on an operation state of the processing circuitry 34 and the surrogate processing circuitry. The interrupt may lead to an undesired change of the operation state of the processing circuitry 34. By redirecting an interrupt to the surrogate processing circuitry 34 an undesired change of the operation state of the processing circuitry 34 can be prevented, leading to e.g. reduced energy consumption and/or shorter latency time and/or increased performance.

Redirecting an interrupt may permit energy saving by keeping as many cores as possible in deep C-state but does not incur interrupt latency waiting for the cores to be woken from deep C-state before servicing those interrupts. It also may improve the performance of workloads in virtualized/cloud environment by improving the tail-latencies associated with the I/O-traffic.

A detail/feature described in combination with the surrogate processing circuitry is applicable to the processing circuitry 34. A detail/feature described in combination with the processing circuitry 34 is applicable to the surrogate processing circuitry.

The processing circuitry 34 (and/or the surrogate processing circuitry) may be a core of a processor, a processing unit of a multi-core processor, a thread of a processor and/or a virtual machine. The processing circuitry 34 (and/or the surrogate processing circuitry) may be a virtual server and/or a physical server.

The processing circuitry 34 (and/or the surrogate processing circuitry) may be configured to perform operation on some external data source. To perform operation on some external data source a definite operation state may be required. Thus, it may be necessary for the surrogate processing circuitry and/or the processing circuitry 34 to change an operation state to perform an operation.

The surrogate processing circuitry has an operation state. The processing circuitry 34 has an operation state. The operation state may be defined by a currently running executing code of the surrogate processing circuitry. The operation state may depend on energy consumption and/or workload and/or energy efficiency of the surrogate processing circuitry. The energy consumption may be defined by a total amount of energy consumed by the surrogate processing circuitry in its operation state, e.g. the energy consumption may be defined by P-States and/or C-States of a processors. The workload may be defined by an occupancy rate of the surrogate processing circuitry.

The energy efficiency may be defined by an energy consumption per operation, e.g. frames per second per watt of the surrogate processing circuitry. The energy efficiency may depend on a desired operation mode, e.g. gaming mode, performance mode or energy saving mode. For example, a desired energy consumption per operation may be higher for gaming mode as for energy saving mode.

The interrupt may be a hardware interrupt, e.g. an input on a keyboard, and/or software interrupt, e.g. special instruction in an instruction set or an exceptional condition in a processing circuitry 34. The interrupt may be a request of a user for computational resources of a cloud network. The interrupt may inform the processing circuitry 34 and may serve as a request for the processing circuitry 34 to interrupt the currently running executing code. Thus, performing an operation triggered by the interrupt may lead to a change of the operation state of the processing circuitry 34. For example, the processing circuitry 34 may be in an idle state (e.g. a deep C-State) for energy saving. To perform an operation requested by some external data source, e.g. a keyboard, the processing circuitry 34 may have to change the operation state (e.g. to a shallower C-State or a P-State). Thus, an energy consumption of the processing circuitry 34 may be unfortunately increased and/or a tail latency may decrease a user experience. By redirecting the interrupt, the performance of the processing device 30 may be beneficial improved, e.g. decreasing energy consumption and/or increasing a user experience.

The surrogate processing circuitry may be identical or substantially identical to the processing circuitry 34, and at least identical in features.

For example, the processing circuitry 34 may be in an idle state (e.g. a deep C-State) for energy saving and the surrogate processing circuitry may be in a performance state (e.g. a P-State). Thus, a tail latency for performing the operation on the interrupt may be longer for the processing circuitry 34 as a tail latency of the surrogate processing circuitry. Therefore, by redirecting the interrupt to the surrogate processing circuitry a user experience may be improved by faster performing of the operation.

In another example, the processing circuitry 34 may be in a higher performance state (e.g. P0-State) as the surrogate processing circuitry (e.g. a P1-State). A higher performance may lead to a higher energy consumption. Thus, an energy consumption per operation may be higher for the processing circuitry 34 as for the surrogate processing circuitry. Therefore, by redirecting the interrupt to the surrogate processing circuitry an energy saving may be increased. Alternatively, the processing circuitry 34 may be in lower a performance state (e.g. P1-State) as the surrogate processing circuitry (e.g. a P0-State). Therefore, by redirecting the interrupt to the surrogate processing circuitry a user experience may be improved by a faster performing of the operation.

In another example, the processing circuitry 34 may have a higher workload as the surrogate processing circuitry. Therefore, by redirecting the interrupt to the surrogate processing circuitry the workload of the different circuitries may be balanced, e.g. leading to a decreased heat generation at the processing circuitry 34. For example, a first physical server may work near an upper limit of his working temperature and thus the first physical server may redirect an interrupt to a second physical server to prevent further heating of the first physical server.

In another example, the processing circuitry 34 may be a designed for computing-intensive operations (e.g. leading to an increased energy consumption and a decreased energy efficiency) and the surrogate processing circuitry may be designed for less intensive computing operations (e.g. leading to a decreased energy consumption and an increased energy efficiency), e.g. a multi core processor with different processor or a cloud network with different physical server. For example, a user request with less intensive computational operations addressed to a first physical server may be readdressed by the first physical server to a second physical server, e.g. leading to an increased energy efficiency. Alternatively, the surrogate processing circuitry may be designed for computing-intensive operations and the processing circuitry 34 may be designed for less intensive computing operations. Thus, a user request with computing-intensive operations addressed to a first physical server may be readdressed by the first physical server to a second physical server, e.g. leading to an increased user experience.

In another example, the surrogate processing circuitry may need to perform any redirected interrupt. For example, the processing circuitry 34 may redirect an interrupt to the surrogate processing circuitry and the surrogate processing circuitry has to perform this interrupt, so that the interrupt is directly performed by the surrogate processing circuitry. A redirection of the interrupt may be disabled for the surrogate processing circuitry. Alternatively, the surrogate processing circuitry may redirect the interrupt to another surrogate processing circuitry and so on. A maximum number of allowed redirections may be defined, e.g. depending on a maximum allowed latency time.

As shown in FIG. 1 the respective one or more interfaces 32 are coupled to the respective processing circuitry 34 at the processing device 30. In embodiments the processing circuitry 34 may be implemented using one or more processing units, one or more processing devices, any means for processing, such as a processor, a computer or a programmable hardware component being operable with accordingly adapted software. Similar, the described functions of the processing circuitry 34 may as well be implemented in software, which is then executed on one or more programmable hardware components. Such hardware components may comprise a general-purpose processor, a Digital Signal Processor (DSP), a micro-controller, etc. The processing circuitry 34 is capable of controlling the interface 32, so that any data transfer that occurs over the interface and/or any interaction in which the interface may be involved may be controlled by the processing circuitry 34.

In an embodiment the control unit 30 may comprise a memory and at least one processing circuitry 34 operably coupled to the memory and configured to perform the below mentioned method.

In embodiments the one or more interfaces 32 may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 32 may comprise further components to enable communication between vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and aspects are mentioned in connection with the examples described below. The example shown in FIG. 1 may comprise one or more optional additional features corresponding to one or more aspects mentioned in connection with the proposed concept or one or more examples described below (e.g. FIGS. 2-7).

Figure 2:
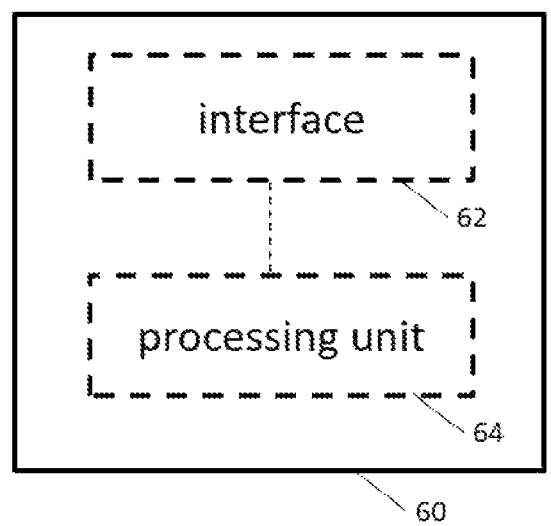
FIG. 2 shows a block diagram of an example of a control unit.

FIG. 2 shows a block diagram of an example of a control unit 60. The control unit 60 comprises an interface 62 configured to communicate with a processing circuitry and a surrogate processing circuitry. Further, the control unit 60 comprises processing unit 64 configured to control the interface 62 and to redirect an interrupt addressed to the processing circuitry to the surrogate processing circuitry, based on operation states of the processing circuitry and the surrogate processing circuitry. The processing circuitry and/or the surrogate processing circuitry may be comprised by a processing device as described in FIG. 1.

The control unit 60 may be a multi-core processor with multiple processing circuitries (or processing units 64), e.g. a unit for maintain a plurality of cores, a processor with multiple threads and/or a virtual machine with multiple threads. The control unit 60 may be a hypervisor of cloud computing. The control unit 60 may be an input/output memory management unit (IOMMU) of a processor.

As shown in FIG. 2 the respective one or more interfaces 62 are coupled to the respective processing unit 64 at the control unit 60. In embodiments the processing circuitry (e.g. the processing circuitry as described in FIG. 1) may be implemented using one or more processing units, one or more processing devices, any means for processing, such as a processor, a computer or a programmable hardware component being operable with accordingly adapted software. Similar, the described functions of the processing unit 64 may as well be implemented in software, which is then executed on one or more programmable hardware components. Such hardware components may comprise a general-purpose processor, a Digital Signal Processor (DSP), a micro-controller, etc. The processing circuitry and/or the processing unit 64 is capable of controlling the interface 62, so that any data transfer that occurs over the interface and/or any interaction in which the interface may be involved may be controlled by the processing circuitry and/or the processing unit 64.

More details and aspects are mentioned in connection with the examples described above and/or below. The example shown in FIG. 2 may comprise one or more optional additional features corresponding to one or more aspects mentioned in connection with the proposed concept or one or more examples described above (e.g. FIG. 1) and/or below (e.g. FIGS. 3-7).

Figure 3:
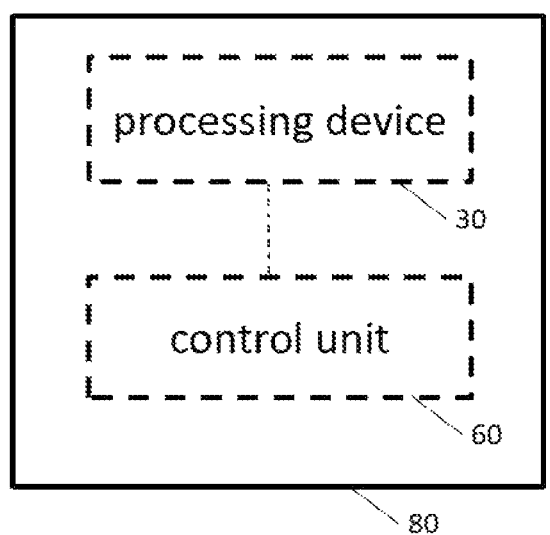
FIG. 3 shows a block diagram of an example of an electronic device.

FIG. 3 shows a block diagram of an example of an electronic device 80. The electronic device 80 comprises a processing device 30 (e.g. the processing device described in FIG. 1) and/or a control unit 60 (e.g. the control unit described in FIG. 2). In another example, the control unit 60 may be connected to the processing device 30 with an interface. For example, the processing device 30 may be configured to perform any interrupt redirected by the control unit 60, e.g. a server of cloud computing has to perform any interrupt redirected by a hypervisor of the cloud computing.

In an example, the processing unit and/or the processing circuitry may be further configured to establish a redirection of any interrupt addressed to the processing circuitry to the surrogate processing circuitry for a defined time. Thus, a processing circuitry, e.g. of the processing device 30, e.g. a core of an electronic device 80, may enter a deeper C-state for a defined time, leading to a reduced energy consumption for this time. The time may be predefined, e.g. a user of an electronic device 80 may have a scheduled phone call and for this time computational operations may be less intensive, so the predefined time may be the time of the scheduled phone call. Alternatively, the defined time may depend on a user behavior, e.g. the use of program. For example, as long as a program used by the user is executed in the foreground of the electronic device 80, all interrupts may be redirected. If the program is closed or executed in the background rather than the foreground the defined time may be elapsed, thus, the redirection may be ended.

In an example, the processing unit and/or the processing circuitry may be further configured to track a rate of interrupts addressed to the processing circuitry and to end the redirection in dependency of the rate of interrupts. For example, a threshold of interrupts per time, e.g. interrupts per second, may be defined to adjust the redirection to a required workload of the processing circuitry. If the number of interrupts addressed to the processing circuitry exceeds the threshold the redirection may be ended, because the surrogate processing circuitry may be overloaded by the number of redirected interrupts, leading to an undesired energy efficiency and/or heat generation of the surrogate processing circuitry.

In an example, the processing unit and/or the processing circuitry may be further configured to manage a minimum number of at least two surrogate processing circuitries as targets for redirecting an interrupt. Thus, the interrupt may be redirected to a surrogate processing circuitry with beneficial characteristic for performing the request. For example, a first surrogate processing circuitry may be used for redirection of computing-intensive operations and a second surrogate processing circuitry may be used for less computing-intensive operations. For example, the first surrogate processing circuitry may be in a shallower C-State as the second surrogate processing circuitry, thus all interrupts may be primarily redirected to the first surrogate processing circuitry and if a number of redirected interrupts per time is exceeded, the interrupts may be secondary redirected to the second surrogate processing circuitry.

In an example, the processing unit and/or the processing circuitry may be further configured to change the minimum number of surrogate processing circuitries (e.g. 1) by adding a surrogate processing circuitry to the minimum number and/or by removing a surrogate processing circuitry. Thus, the control unit 60 may constantly adjust the number of surrogate processing circuitries. For example, the minimum number of surrogate processing circuitries may be one and if a workload of this surrogate processing circuitry exceeds a defined maximum workload-threshold, the control unit 60 may add another surrogate processing circuitry to the minimum number. This leads to a minimum number of two surrogate processing circuitries, between which the redirected interrupts may be shared, which may lead to a decreased workload of each surrogate processing circuitry. Alternatively, if the workload of each surrogate processing circuitry of the two surrogate processing circuitries falls below a minimum workload-threshold one of the two surrogate processing circuitries may be removed, which may enable this surrogate processing circuitry to enter a deeper C-State leading to a reduced energy consumption.

For example, OS may maintain a threshold number of surrogate processing circuitries, e.g. cores, in shallow C-states to ensure they can wakeup with little to no latency increase in handling the interrupt. The minimum number of surrogate processing circuitries may be just one surrogate processing circuitry for the entire system or a bunch of surrogate processing circuitries depending on the requirement from the system and can be configured by an administrator, and/or by auto-scaling on demand based on how the system behaves.

In an example, the processing unit and/or the processing circuitry may be further configured to transmit information of an established redirection of any interrupts addressed to the processing circuitry to improve the operation mode of the processing circuitry. For example, a power-saving mode of the processing circuitry may be improved, e.g. by allowing a deeper C-state of the processing circuitry.

In an example, the processing unit may be further configured to scan all interrupts of the control unit and/or the processing device to redirect every interrupt addressed to the processing circuitry to the surrogate processing circuitry.

For example, an operation system (OS) can scan through the interrupts that happen to be targeting an outgoing CPU (also referred as processing circuitry). For each interrupt, OS may migrate this interrupt to one of the target pools of CPUs (surrogate processing circuitries) being maintained at a shallow C-state. OS's may use per-CPU vectors to manage the growing number of interrupt resources which tend to grow drastically with increased workload (e.g. on new devices). When the OS performs such a consolidation, there may be trouble generating these vectors or the OS may run out of vectors among the pool or cores maintained at shallow C-state. In these scenarios the OS may have e.g. the option to increase the pool by adding another CPU to the pool of cores being maintained at a shallow C-state. Optionally or alternatively, the OS may use posted interrupts (PI) in native kernel. PI allows 256 sub-vectors for every host CPU vector. This mechanism may allow much higher scalability and may allow the device vector to remain unchanged and the OS can still map the sub-vector to the device interrupt.

Once the processing circuitry interrupt is migrated to a different target (surrogate processing circuitry), OS may provide a hint on a redirection, e.g. in mwait, permitting deepest C-state using e.g. standard HW processing mechanisms. This may allow the processing circuitry a quickly transition to deep C-State since all interrupt sources are migrated to other surrogate processing circuitries.

The OS can maintain a set of statistics to track how often the interrupts are coming after being migrated to a surrogate processing circuitry. The rate of interrupts can determine when to migrate back to the original assigned processing circuitry. Hints from the driver can also be permitted that dictate if the OS needs to switch back to original processing circuitry immediately, or after a specified threshold which can override the OS default tuning threshold.

For example, when the processing circuitry enter a deep-C state, hardware (HW; e.g. power control unit) may notify the OS of the electronic device 80 via an interrupt to one of threads in the processing circuitry that is ready to enter a deeper C-state. OS may use this hint to re-target any interrupts that are targeted to threads of this processing circuitry and migrate them to another CPU target, e.g. the surrogate processing circuitry. This may allow the interrupt to fire on a CPU that is at a shallow C-state preselected by the OS. In a multi socket system, this may allow processing circuitries and/or packages to enter deeper idle states saving energy, but at the same time, interrupt latencies may be reduced by ensuring interrupts are not delivered to processing circuitries in deep-c states. Instead, interrupts may be delivered to processing circuitries in shallower C-State, than the one the interrupt was originally targeted. The OS can also migrate any timer events and such may ensure the processing circuitries and/or a socket, in which the processing circuitries may be embedded, can be idle longer if idle conditions persist.

Optionally or alternatively, instead of scanning the interrupts and migrating them individually from the processing circuitry entering a deeper C-state to the designated surrogate processing circuitries with shallower C-state support, OS may utilize the concept of posted interrupt in native kernel to support efficient/low-overhead interrupt migration. In an example, the processing unit and/or the processing circuitry may be further configured to allocate a posted interrupt descriptor, PID, for the processing circuitry and the surrogate processing circuitry. The PID comprises a notification vector, NV, and a notification destination, NDST. Further, the processing unit and/or the processing circuitry may be configured to modify the NDST of the PID of the processing circuitry to redirect interrupts addressed to the processing circuitry. Thus, computational resources for the redirection may be decreased. This example is described in further detail in reference to FIGS. 4a to 4f.

More details and aspects are mentioned in connection with the examples described above and/or below. The example shown in FIG. 3 may comprise one or more optional additional features corresponding to one or more aspects mentioned in connection with the proposed concept or one or more examples described above (e.g. FIGS. 1-2) and/or below (e.g. FIGS. 4a-7).

Figure 4A:
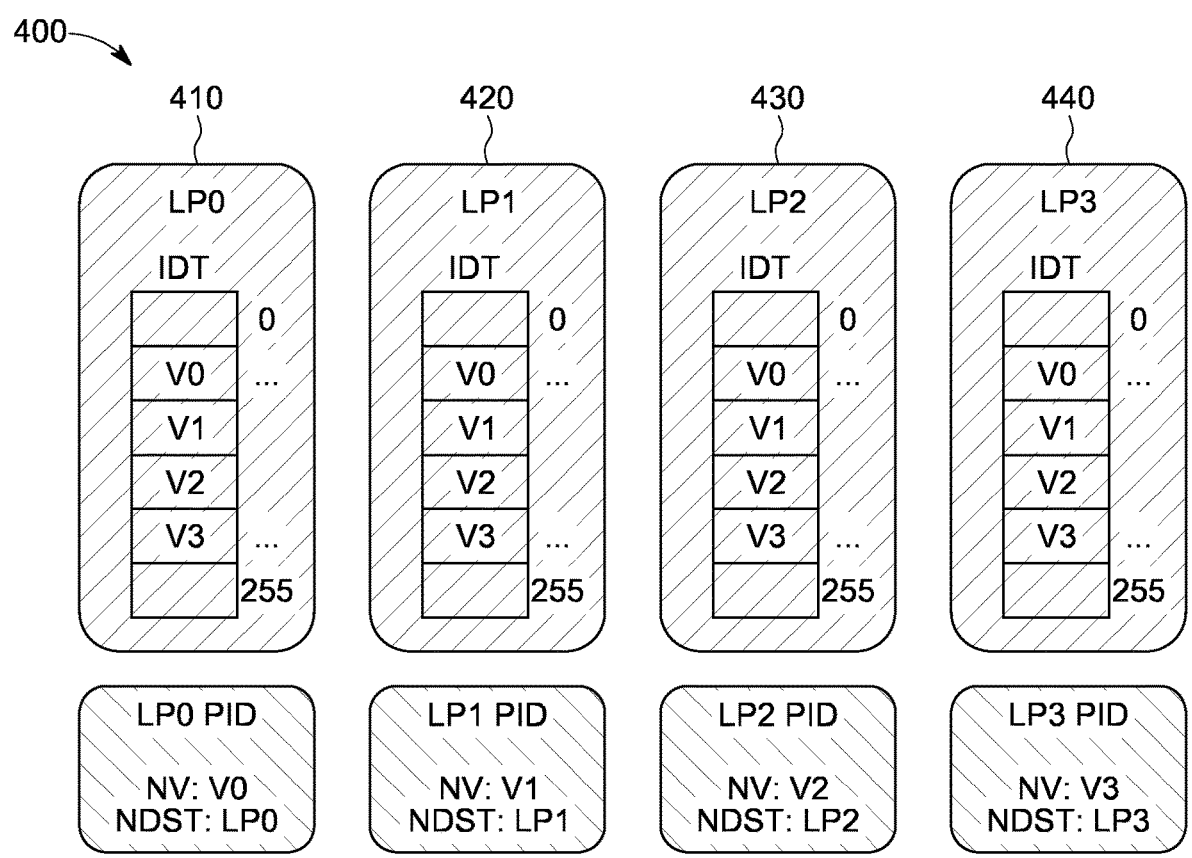
FIGS. 4a to 4f show two examples of establishing an interrupt migration architecture.
Figure 4B:
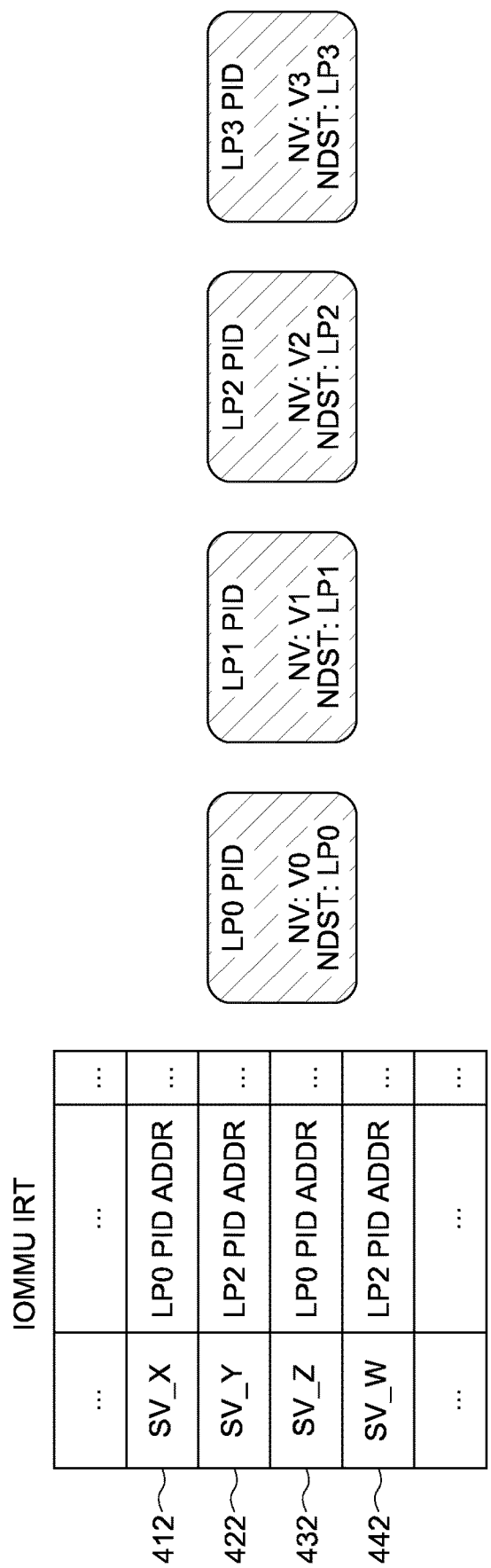
Figure 4C:
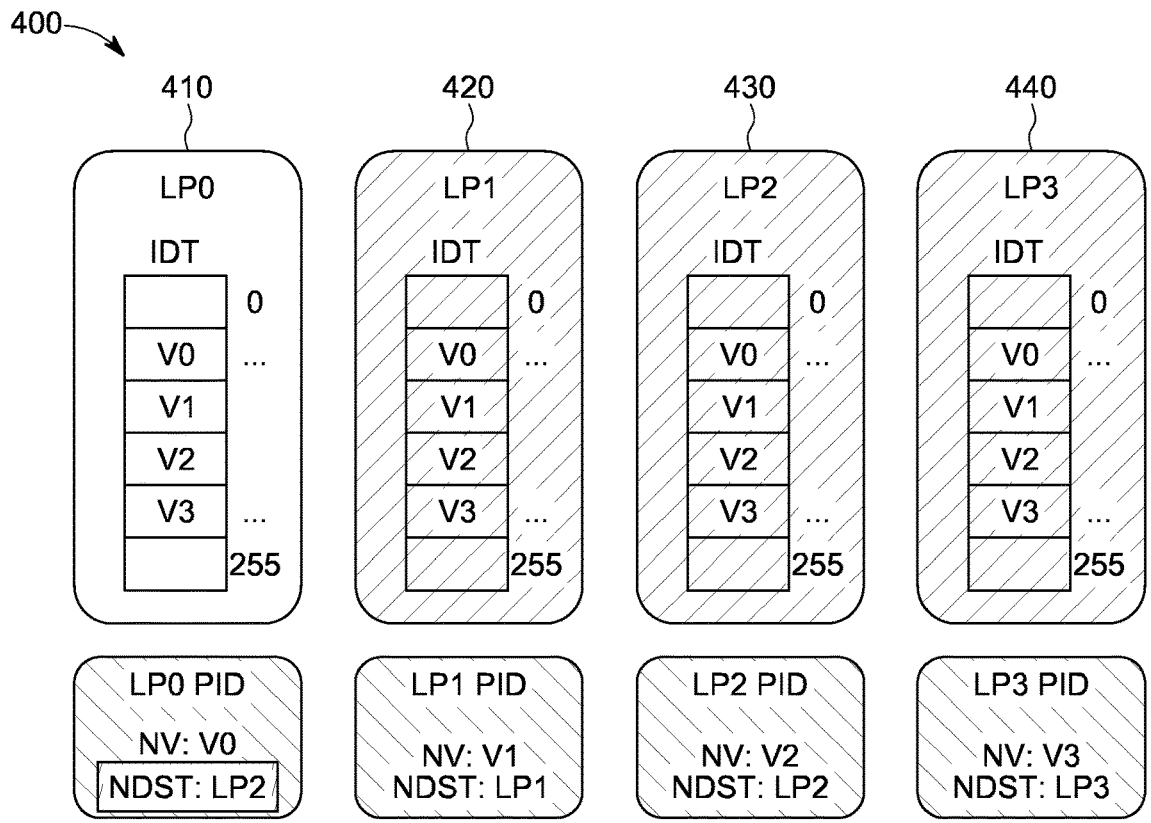
Figure 4D:
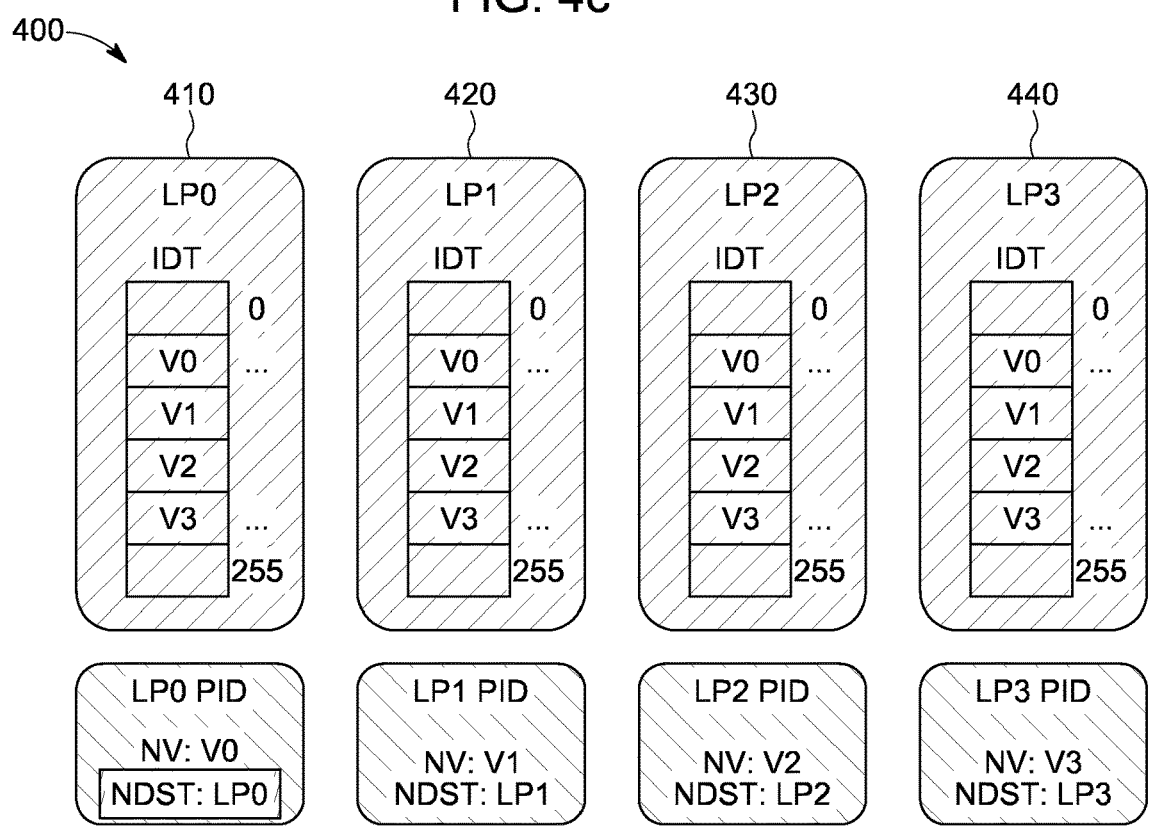
Figure 4E:
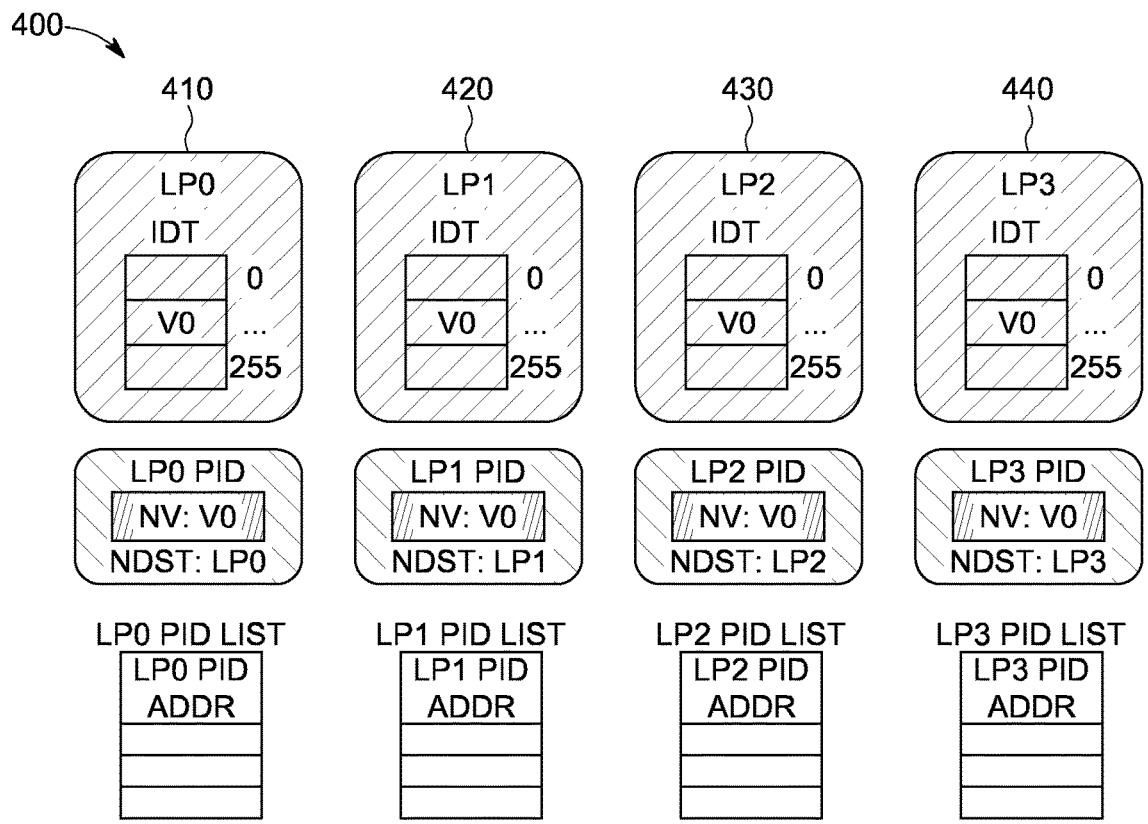
Figure 4F:
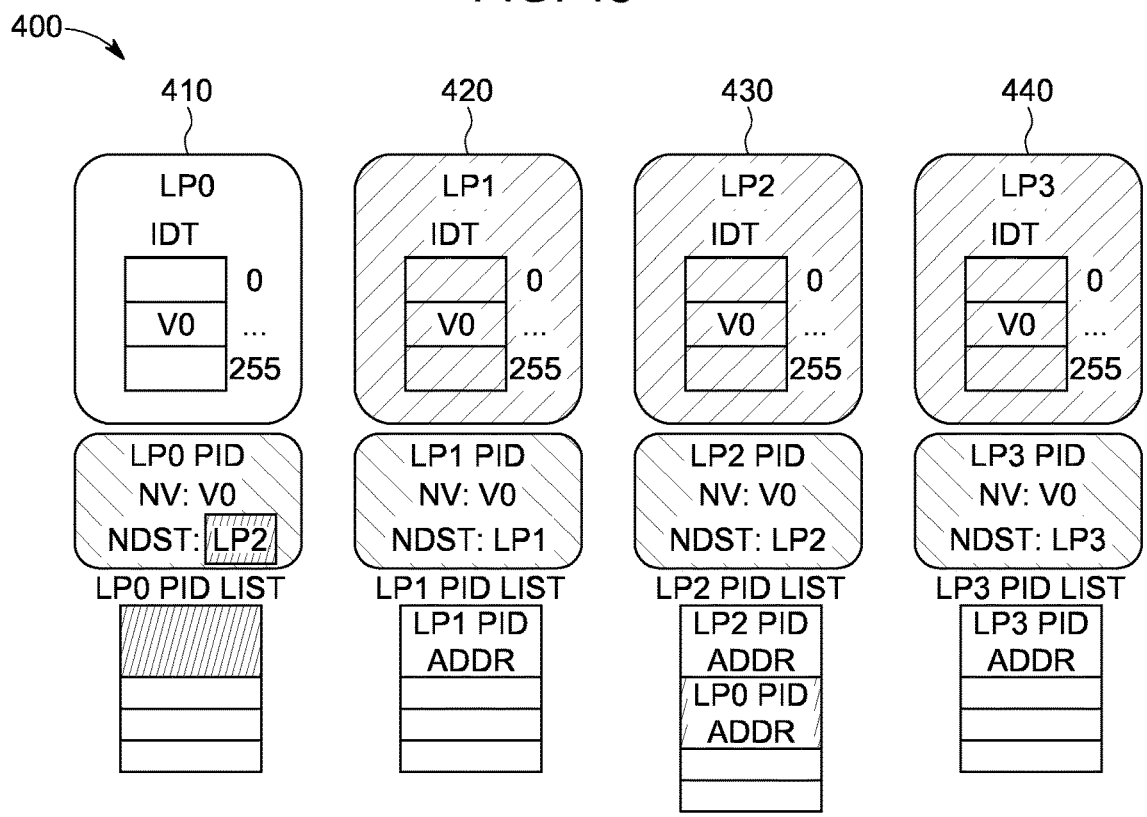

FIGS. 4a to 4f show two examples of establishing an interrupt migration architecture. A first example is shown in FIGS. 4a-4d and a second example is shown in FIGS. 4e and 4f. The interrupt migration architecture may be a one-shot interrupt migration architecture.

FIG. 4a shows a pictorial representation of a 4-core system 400 after a setup phase. The 4-core system comprises four cores LP0 410, LP1 420, LP2 430 and LP3 440. Each core 410, 420, 430, 440 may be a processing circuitry or a surrogate processing circuitry.

In a boot/setup phase an OS may allocate one posted interrupt descriptor for each logical processor (LP) 410, 420, 430, 440. Each such descriptor may be used for posting all the interrupts that are to be delivered to the respective LP 410, 420, 430, 440. The OS may associate at least one physical vector number for each LP 410, 420, 430, 440 number that may be used to identify the LP 410, 420, 430, 440 and thereby a corresponding PID. As can be seen from FIG. 4a, 4 vectors (V0-V3) may be allocated as NVs for each of the PID (PID0-3 respectively). The PID may be looked up to identify the source of an interrupt and make appropriate updates regarding interrupt handling (e.g. clear ON bit). The OS may configure NV field of each PID with these vector numbers.

Further, the OS may configure a notification destination (NDST) field with an advanced programmable interrupt controller (APIC) destination ID of target LP associated with each PID. Each PID may be configured with the respective APIC destination ID. Further, the OS may enable interrupt remapping and posting.

At the beginning the OS may allocate and configurate interrupts. For example, as can been seen from FIG. 4b the OS may configure 4 interrupts on an electronic device comprising the 4-core system 400 with the four LP 410, 420, 430, 440. OS may target the interrupt #0 (SV_X; 412) and 2 (SV_Z; 432) to LP0 410 and interrupts 1 (SV_Y; 422) and 3 (SV_W; 442) to LP2 430. Therefore, the OS may allocate 4 sub-vectors (SV_X, SV_Y, SV_Z, SV_W) each associated with the 4 interrupts of the electronic device. Further, the OS may add two entries in the interrupt remapping table with virtual vector (VV) field configured with SV_X and SV_Z respectively and PDAH/PDAL field configured with PID associated with LP0. The OS may add two other entries in the interrupt remapping table with VV field configured with SV_Y and SV_W respectively and PDAH/PDAL field configured with PID associated with LP2.

For example, for increasing a performance and/or a user experience, the OS may migrate interrupts from one LP 410, 420, 430, 440 to another LP 410, 420, 430, 440. In an example, the processing unit and/or the processing circuitry may be further configured to associate a different NV to the processing circuitry and the surrogate processing circuitry to redirect all interrupts addressed to the processing circuitry to the surrogate processing circuitry. Redirecting all interrupts of a processing circuitry to a surrogate processing circuitry can be done straight forward and therefore, can be done by the OS with little computational effort.

For example, interrupts addressed to the LP0 410 may be redirected to the LP2 430, which may be used as surrogate processing circuitry. FIG. 4c shows an example of this redirection. For example, LP0 410 may try to enter a deeper C-state (operation state is changed to an operation state with a lower energy consumption). To allow the processing circuitry (e.g. LP0 410) to enter a deeper C-State, all interrupts may be needed to be migrated to a surrogate processing circuitry, e.g. LP2 430. As can be seen from FIG. 4c, the OS may change the NSDT of the processing circuitry (e.g. LP0 410), e.g. by performing a compare-xchange operation on the PID associated with processing circuitry to redirect all the interrupts to a surrogate processing circuitry (e.g. LP2 430). Thus, the processing circuitry (e.g. LP0 410) can enter a deeper C-state, since no interrupts prevent it from entering a deeper C-state, leading to a decreased energy consumption.

To determine a source of an interrupt the OS may use the PID. Once the interrupt may arrive on LP2 430 the OS (e.g. the interrupt service routine, ISR) may look-up the PID to determine the sub-vector (and thereby interrupt source) and may invoke a respective interrupt service routine. On the event that a particular LP 410, 420, 430, 440 may receive its own interrupts and interrupts migrated from another LP 410, 420, 430, 440 currently in deep C-state (e.g. LP0 410 in FIG. 4c), a physical vector # or an independent ISRs for each physical vector can be used to determine which PID to look-up to identify the source. For example, in FIG. 4c, if LP2 430 receives an interrupt on V0, it may examine LP0 410 PID to determine the sub-vector and the interrupt source. Whereas if LP2 430 receives an interrupt on V2, it may examine LP2 430 PID to determine the sub-vector and the interrupt source. Thus, the source of an interrupt can be determined by the surrogate processing circuitry.

When a redirection is to be ended, the OS may migrate the interrupts back to the processing circuitry resulting in an end of the redirection. They may determine the original LP 410, 420, 430, 440 to migrate the interrupts back to. Further, the OS may change the NSDT of the processing circuitry (e.g. LP0 410 in FIG. 4d), e.g. by performing a compare-xchange operation on the PID to modify the NDST field back to the APIC ID of the processing circuitry.

In an example, the processing control unit may be further configured to manage a list of PIDs to redirect specific interrupts of the processing circuitry to the surrogate processing circuitry. By redirecting specific interrupts an improved load balance may be achieved. This is more resource consuming than redirecting all interrupts but may allow a balanced load. Thus, a redirection process may be adjusted to either a desired load balance or a desired reduced resource consumption of the electronic device 80.

The OS may allocate only one physical vector for receiving posted interrupt notification rather than allocating per core a physical vector. In this example, the OS may need to maintain a list of PIDs programmed with given processing circuitry as a destination ID to search/scan PIDs to determine the interrupt source/sub-vector. FIG. 4e shows an example of a 4-core system after a setup phase. As can be seen, each LP 410, 420, 430, 440 has an assigned PID list with one PID address. Further, each LP 410, 420, 430, 440 has the same NV (V0).

FIG. 4f an example of the 4-core system, after the interrupts of LP0 410 are migrated over to the LP2 430, so that LP0 410 may be allowed to enter a deeper C-state. If LP2 430 receives a (posted) interrupt notification in this example, it has to examine each of the PIDs in LP2 PID list (namely LP2 PID and LP0 PID in FIG. 4*f*) to determine the source of the interrupt.

For virtualized scenarios, same technique as described may be used except VMM is the software entity managing the posted interrupt descriptors and performing one-shot interrupt migration as VP gets scheduled out.

All the example here-in described with respect to scenarios of core (processing circuitry) entering deep-c state, can be equally applied to a scenario of virtual processor getting context switched-out.

More details and aspects are mentioned in connection with the examples described above and/or below. The example shown in FIGS. 4*a* to 4*f* may comprise one or more optional additional features corresponding to one or more aspects mentioned in connection with the proposed concept or one or more examples described above (e.g. FIGS. 1-3) and/or below (e.g. FIGS. 5*a*-7).

Figure 5A:
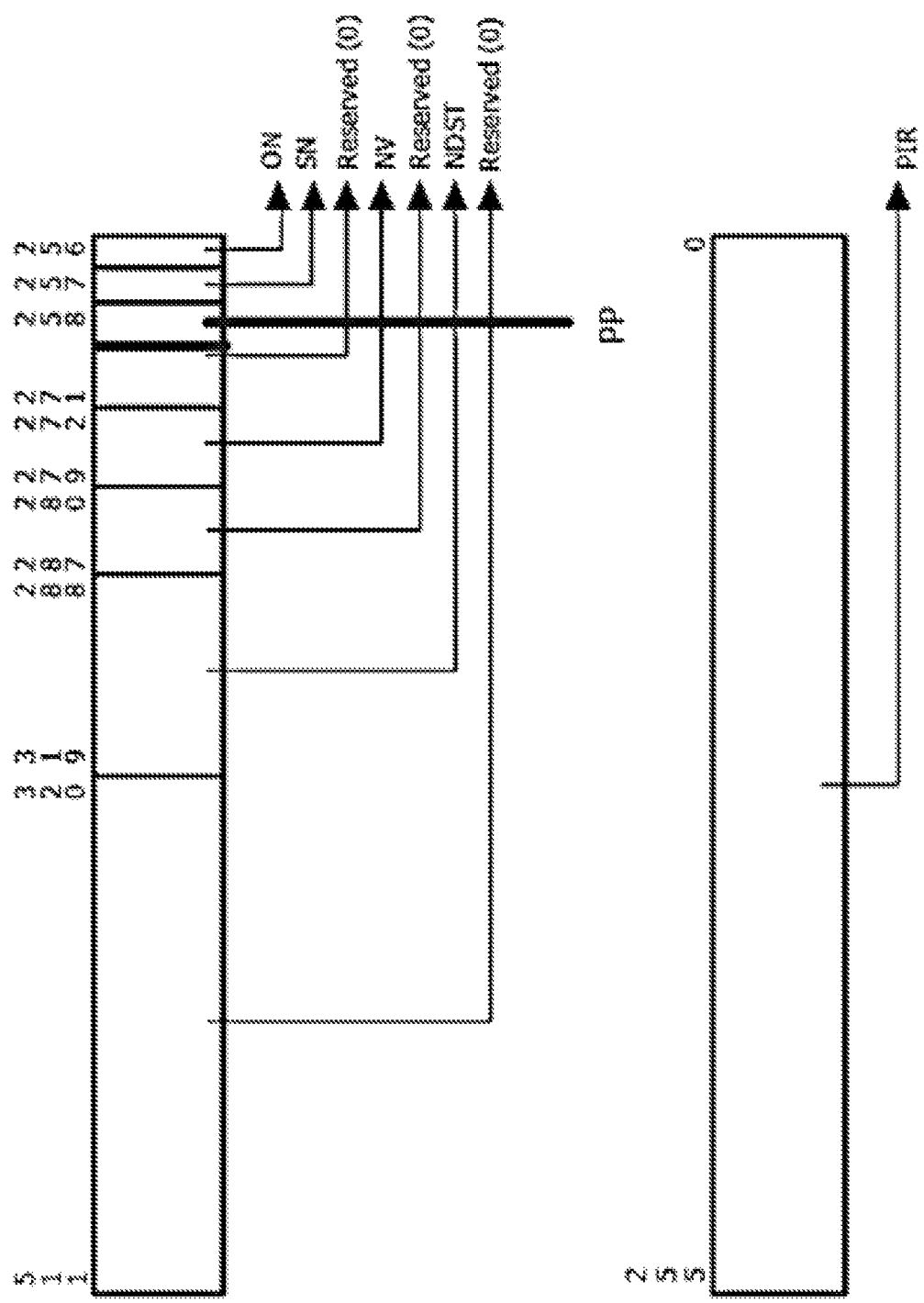
FIGS. 5a to 5c show an example of an extension of posted interrupt architecture.
Figure 5B:
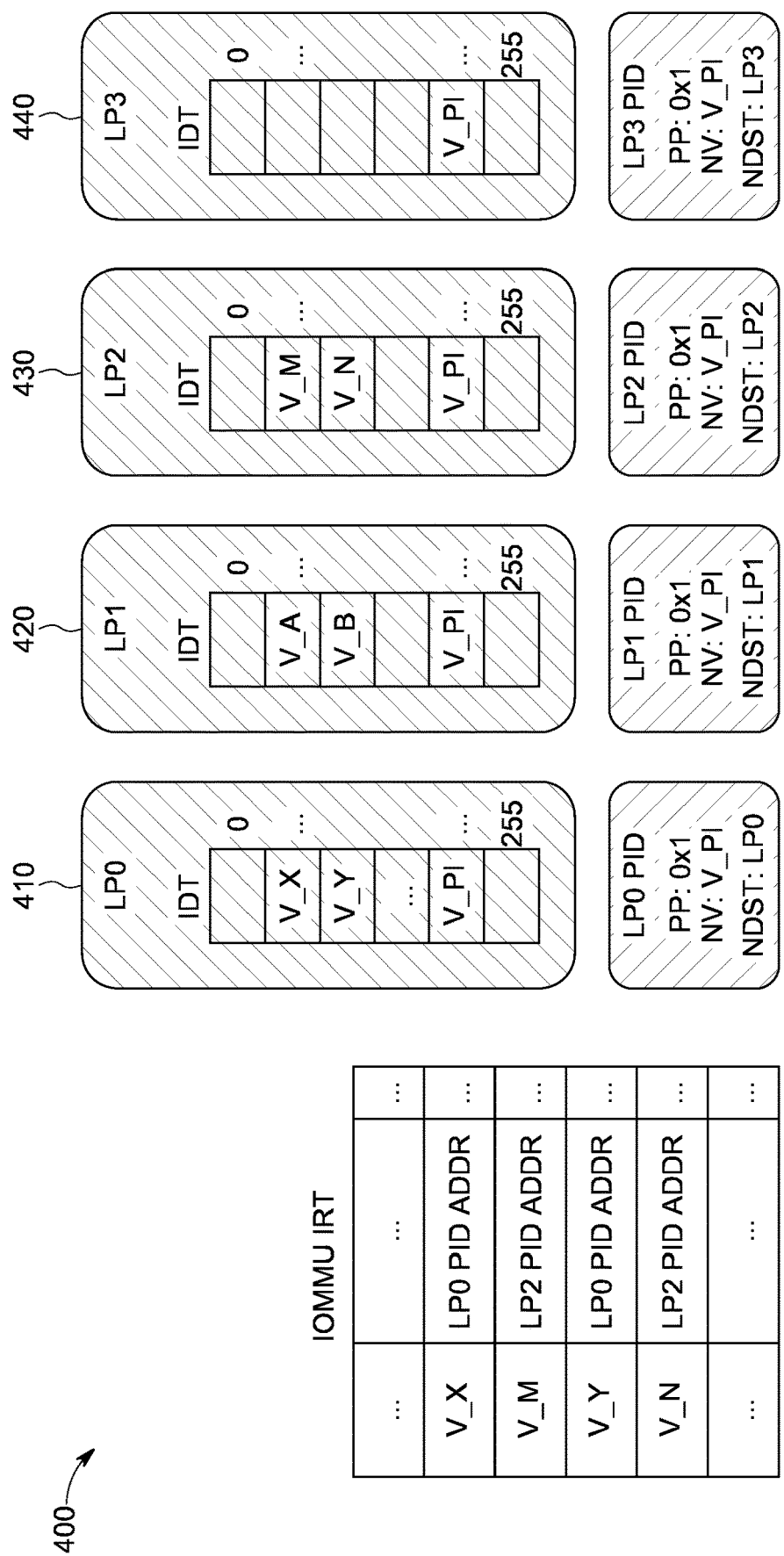
Figure 5C:
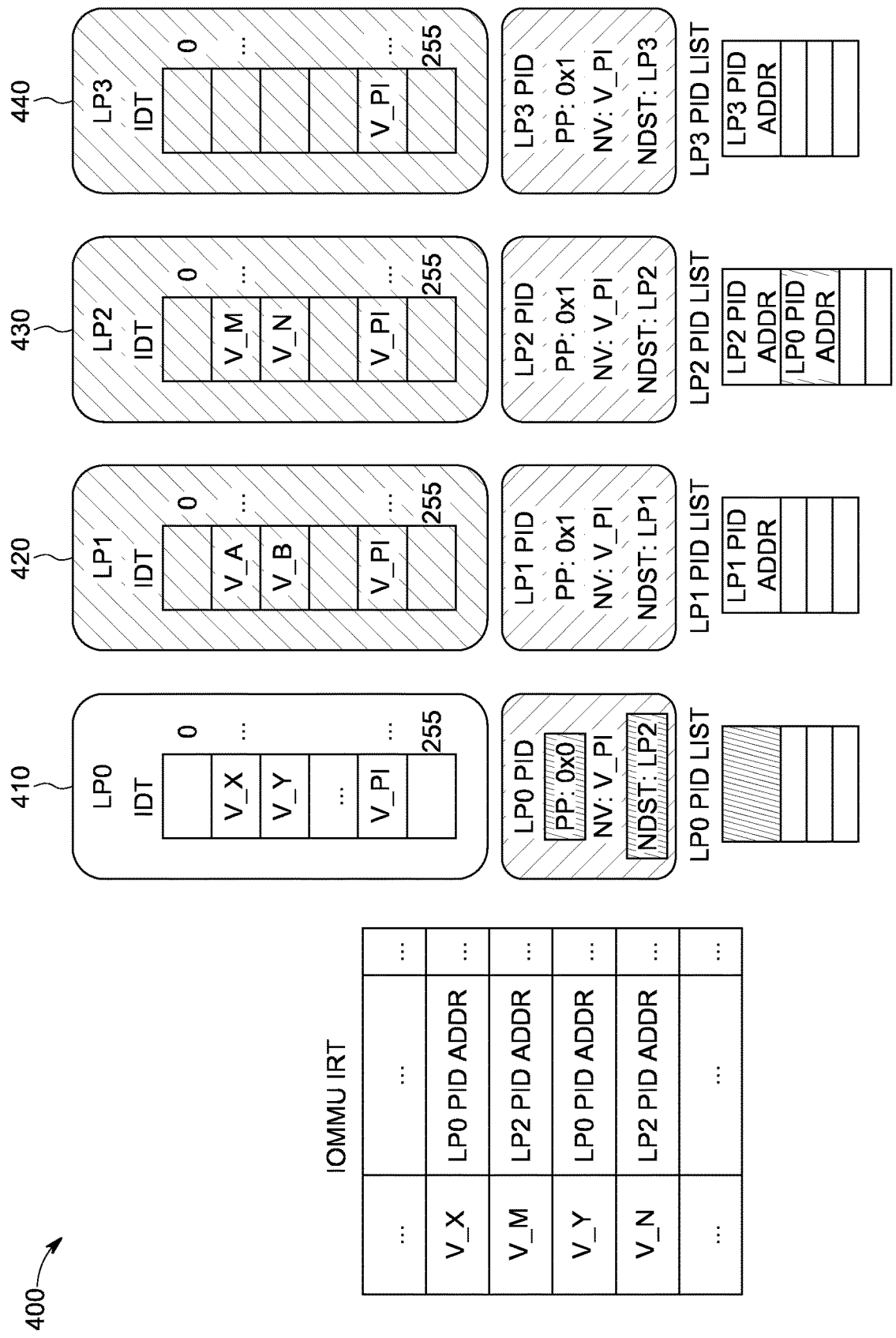

FIGS. 5*a* to 5*c* show an example of an extension of posted interrupt architecture. In the example described in FIGS. 4*a* to 4*c* the OS may need to examine the PID to determine the sub-vector and the interrupt source (which may impact a performance negatively) and also may clear the outstanding notification (ON) bit while handling the interrupt. Thus, by extending the posted interrupt architecture the OS may be enabled to use a posting passthrough-mode by setting a posting-passthrough (PP) bit in the PID. An example of adding a PP bit is shown in FIG. 5*a* and FIGS. 5*b* and 5*c* show an example of redirecting an interrupt using this PP bit.

In an example, the processing unit and/or the processing circuitry is further configured to add a passthrough-mode to the PID to establish and/or end the redirection of interrupts addressed to the processing circuitry to the surrogate processing circuitry.

The vertically written numbers in FIG. 5*a* above the two boxes highlight different bit position (and are no reference signs). The PIR may be defined in the first 256 bits. In the bits from position 256-511 further parameters may be defined, e.g. ON, NV, NDST. A bit for the PP may be added after the bit position 257 used for SN at bit position 258.

In an example, the passthrough-mode is added by setting a passthrough bit in the PID and wherein establishing and/or ending the redirection is performed by flipping the (PP) bit. When the PP bit is set to a first value (e.g. 0x1) in PID, the hardware (HW) may use the virtual-vector number from an interrupt-remap-table-entry (IRTE) as a physical vector number to generate the posted interrupt notification and posting related checks/updates to the PID are skipped (e.g. ON bit is not set). In the event that PP bit is set to a second value (e.g. 0x0) in PID, HW may use the notification-vector number set in PID as a physical vector number (as it normally does) to generate the posted interrupt notification.

In FIG. 5*b* is an example for a 4-core system shown. As can be seen, during the first (normal) operation mode, V_X/V_M/V_Y/V_N may be used to notify the core/s about the interrupt. No posting related updates may be made to PID and PID is not looked at or modified during the interrupt handling software (SW) flow.

In FIG. 5*c* is an example of the 4-core system shown, where LP0 is entering a deeper C-state. The OS may has modified the PID for LP0 410 to set NDST to LP2 430 and PP is set to the second value (0x0). Now, HW may start to convert V_X and V_Y virtual vectors to PID updates and will use V_PI to notify LP2 430 about the arrival of these interrupts.

To migrate the interrupts back to the original core, the OS may update PP back to the first value (0x1) and NDST back to the LP0 410. In another example, OS may allocate one PI vector representing one core on each LP instead of allocating just one PI vector (V_PI) as shown in FIG. 5*c*. Such an optimization may remove the need for the OS to search through the PID list on arrival of the posted interrupt notification, resulting e.g. in a decreased energy consumption of the electronic device 80.

Such a posted interrupt architecture extension may enable the OS to use existing interrupt handling model while running normally, whereas fallback to the interrupt posting flow (and complexity/overheads associated with it) when running in a migration mode.

In an example the electronic device 80 may be a personal computer, smartphone, notebook, smart device and/or cloud computing.

More details and aspects are mentioned in connection with the examples described above and/or below. The example shown in FIGS. 5*a* to 5*c* may comprise one or more optional additional features corresponding to one or more aspects mentioned in connection with the proposed concept or one or more examples described above (e.g. FIGS. 1-4*0* and/or below (e.g. FIGS. 6-7).

Figure 6:
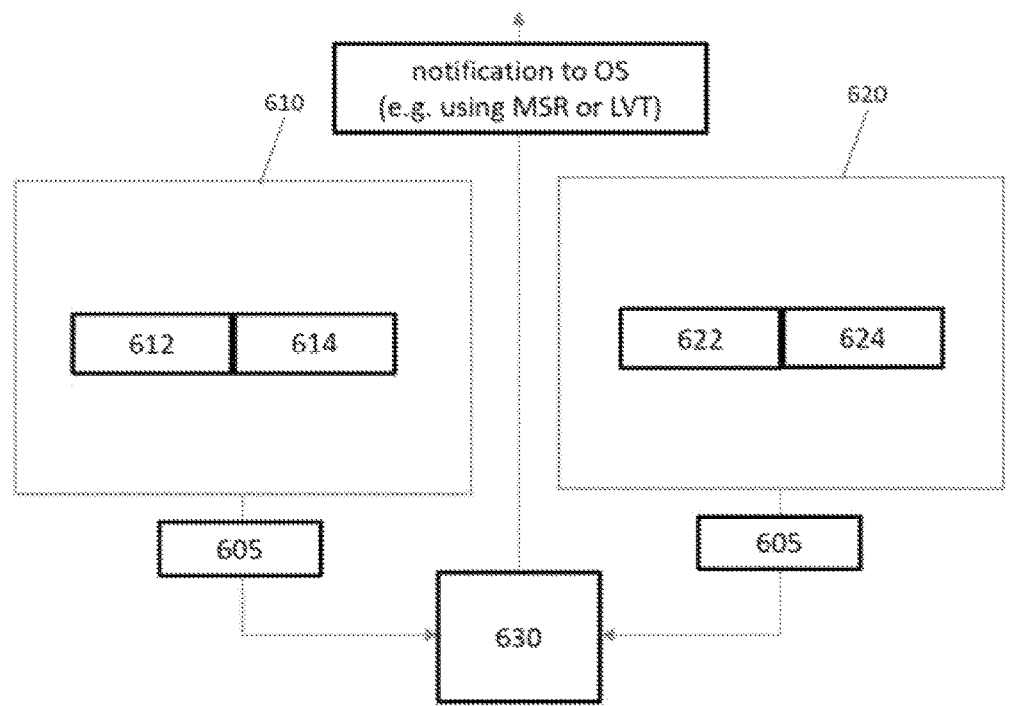
FIG. 6 shows an example of a hardware configuration.

FIG. 6 shows an example of a hardware configuration 600. The hardware configuration 600 comprises a first processing circuitry 610 comprising a first 612 and a second 614 thread, a second processing circuitry 620 comprising a first 622 and a second thread 624 and a power control unit (PCU) 630. Each processing circuitry 610, 620 may be processing circuitry or a surrogate processing circuitry as described above. Further, the hardware configuration may comprise a hardware extension, an observing circuitry 605, for each processing circuitry 610, 620. Alternatively, the hardware configuration 600 may comprise less observing circuitry 605 than processing circuitries 610, 620, e.g. only one observing circuitry 605 for all processing circuitries 610, 620.

In an example, the electronic device described above, e.g. in FIG. 3, may further comprise an observing circuitry 605 configured to observe the operation state of the processing circuitry and/or the surrogate processing circuitry. Further, the observing circuitry 605 may be configured to transmit information about the observed operation state to the control unit and/or the processing device. Optionally or alternatively, the observing circuitries may be a part of the processing circuitry and/or the processing unit. For example, the processing circuitry and/or the processing unit may be further configured to observe the operation state of the processing circuitry and/or the surrogate processing circuitry and to transmit information about the observed operation state to the control unit. By using the observing circuitry 605 the operation state of the processing circuitry and/or the surrogate processing circuitry can be determined, resulting in an improved possibility to redirect interrupts, e.g. for the PCU 630 and/or the OS.

In an example, the information about the observed operation state is transmitted by storing it in a model-specific register (MSR) and/or a local vector table (LVT) accessible by the control unit and/or the processing device.

For example, a hardware mechanism may be used to enumerate the processing circuitries 610, 620 to support the HW extension (observing circuitry 605). An enumeration the processing circuitries 610, 620 which supports an idle notification may be performed. Further, a control mechanism to specify a target (surrogate) processing circuitry 610, 620 and a vector associated with these may be defined. These may be done by LVT interrupts much like certain processing circuitry 610, 620 events may be triggered by the processing circuitry 610, 620. When a processing circuitry 610, 620 enters a pre-specified C-state, the PCU may provide a notification hereof to the OS.

In CPU architecture capabilities may be enumerated to OS via CPU identification (CPUID) instruction. In some cases, hardware also provides capabilities through an MSR. A facility for the OS to identify the associated PCU may be sending the interrupt to the OS to notify the processing circuitry entering a deeper C-state. The association can be identified programmatically using configuration, or via an Advanced Configuration and Power Interface (ACPI) table mechanism.

For example, a configuration mechanism to permit the OS to be notified when cores enter deep-c state may be an MSR and/or an LVT. This may allow the OS to configure the interrupt vector number to be used for notification. In another example, the MSR and/or LVT can be used to identify the cause of the notification. This register may have the bitmap of a number of processing circuitries going to enter a deeper C-State.

More details and aspects are mentioned in connection with the examples described above and/or below. The example shown in FIG. 6 may comprise one or more optional additional features corresponding to one or more aspects mentioned in connection with the proposed concept or one or more examples described above (e.g. FIGS. 1-5c) and/or below (e.g. FIG. 7).

Figure 7:
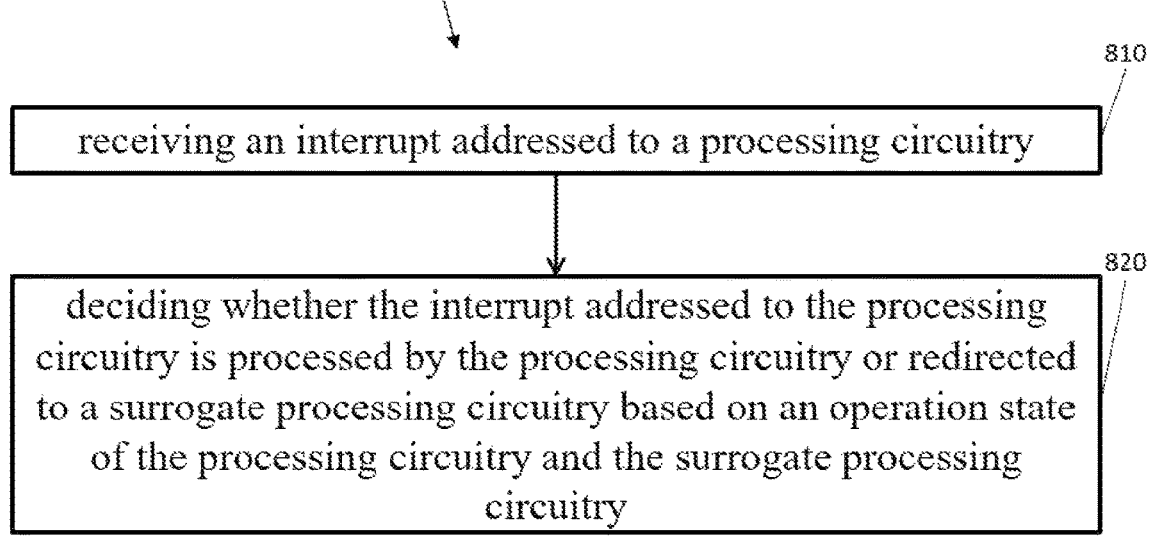
FIG. 7 shows an example of a method.

FIG. 7 shows an example of a method 800. The method 800 comprises receiving 810 an interrupt addressed to a processing circuitry. Further, the method 800 comprises deciding whether the interrupt addressed to the processing circuitry is processed by the processing circuitry or redirected to a surrogate processing circuitry based on an operation state of the processing circuitry and the surrogate processing circuitry. The method may be performed by the electronic device described above (e.g. in FIG. 1) and/or the control unit described above (e.g. in FIG. 2) and/or the electronic device described above (e.g. in FIG. 3).

More details and aspects are mentioned in connection with the examples described above. The example shown in FIG. 7 may comprise one or more optional additional features corresponding to one or more aspects mentioned in connection with the proposed concept or one or more examples described above (e.g. FIGS. 1-6).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

An example (e.g. example 1) relates to a processing device, comprising an interface configured to receive information about an operation state of a surrogate processor and processing circuitry configured to control the interface and to decide whether an interrupt addressed to the processing circuitry is processed by the processing circuitry or redirected to the surrogate processing circuitry based on an operation state of the processing circuitry and the surrogate processing circuitry.

Another example (e.g. example 2) relates to a control unit, comprising an interface configured to communicate with a processing circuitry and a surrogate processing circuitry and processing unit configured to control the interface and to redirect an interrupt addressed to the processing circuitry to the surrogate processing circuitry, based on operation states of the processing circuitry and the surrogate processing circuitry.

Another example (e.g. example 3) relates to an electronic device, comprising the processing device as previously described (e.g. example 1) and/or the control unit as previously described (e.g. example 2).

Another example (e.g. example 4) relates to a previously described example (e.g. example 3) further comprising observing circuitry configured to observe the operation state of the processing circuitry and/or the surrogate processing circuitry and transmit information about the observed operation state to the control unit and/or the processing device.

Another example (e.g. example 5) relates to a previously described example (e.g. example 3-4) wherein information about the observed operation state is transmitted by storing it in a model-specific register and/or a local vector table accessible by the control unit and/or the processing device.

Another example (e.g. example 6) relates to a previously described example (e.g. example 3-5) wherein the processing unit and/or the processing circuitry is further configured to establish a redirection of any interrupt addressed to the processing circuitry to the surrogate processing circuitry for a defined time.

Another example (e.g. example 7) relates to a previously described example (e.g. example 3-6), wherein the processing unit and/or the processing circuitry is further configured to track a rate of interrupts addressed to the processing circuitry and to end the redirection in dependency of the rate of interrupts.

Another example (e.g. example 8) relates to a previously described example (e.g. example 3-7) wherein the processing unit and/or the processing circuitry is further configured to manage a mini-mum number of at least two surrogate processing circuitries as targets for redirecting an interrupt.

Another example (e.g. example 9) relates to a previously described example (e.g. example 3-8), wherein the processing unit and/or the processing circuitry is further configured to change the mini-mum number of surrogate processing circuitries by adding a surrogate processing circuitry to the minimum number and/or by removing a surrogate processing circuitry.

Another example (e.g. example 10) relates to a previously described example (e.g. example 3-9), wherein the processing unit and/or the processing circuitry is further configured to transmit information of an established redirection of any interrupts addressed to the processing circuitry to improve a power-saving mode of the processing circuitry.

Another example (e.g. example 11) relates to a previously described example (e.g. example 3-10), wherein the processing unit is further configured to scan all interrupts of the control unit and/or processing device to redirect every interrupt addressed to the processing circuitry to the surrogate processing circuitry.

Another example (e.g. example 12) relates to a previously described example (e.g. example 3-11), wherein the processing unit and/or the processing circuitry is further configured to:
allocate a posted interrupt descriptor, PID, for the processing circuitry and the surrogate processing circuitry, wherein the PID comprises a notification vector, NV, and a notification destination, NDST, and modify the NDST of the PID of the processing circuitry to redirect interrupts addressed to the processing circuitry.

Another example (e.g. example 13) relates to a previously described example (e.g. example 3-12), wherein the processing unit and/or the processing circuitry is further configured to associate a different notification vector to the processing circuitry and the surrogate processing circuitry to redirect all interrupts addressed to the processing circuitry to the surrogate processing circuitry.

Another example (e.g. example 14) relates to a previously described example (e.g. example 3-13), wherein the processing unit and/or the processing circuitry is further configured to manage a list of PIDs to redirect specific interrupts of the processing circuitry to the surrogate processing circuitry.

Another example (e.g. example 15) relates to a previously described example (e.g. example 3-14), wherein the processing unit and/or the processing circuitry is further configured to add a passthrough-mode to the PID to establish and/or end the redirection of interrupts addressed to the processing circuitry to the surrogate processing circuitry.

Another example (e.g. example 16) relates to a previously described example (e.g. example 3-15), wherein the passthrough-mode is added by setting a passthrough bit in the PID and wherein establishing and/or ending the redirection is performed by flipping the bit.

Another example (e.g. example 17) relates to a previously described example (e.g. example 3-16), wherein the electronic device is a personal computer and/or cloud computing.

Another example (e.g. example 18) relates to a method, comprising receiving an interrupt addressed to a processing circuitry; and deciding whether the interrupt addressed to the processing circuitry is processed by the processing circuitry or redirected to a surrogate processing circuitry based on an operation state of the processing circuitry and the surrogate processing circuitry.

Another example (e.g. example 19) relates to a previously described example (e.g. example 18), further comprising observing an operation state of the processing circuitry and/or the surrogate processing circuitry; and transmitting information about the observed operation state to the control unit and/or the processing device.

Another example (e.g. example 20) relates to a previously described example (e.g. example 18-19), further comprising storing information about the observed operation state in a model-specific register and/or a local vector table accessible by the control unit (60) and/or the processing device.

Another example (e.g. example 21) relates to a previously described example (e.g. example 18-20), further comprising establishing a redirection of any interrupt addressed to the processing circuitry to the surrogate processing circuitry for a defined time.

Another example (e.g. example 22) relates to a previously described example (e.g. example 18-21), further comprising allocating a posted interrupt descriptor, PID, for the processing circuitry and the surrogate processing circuitry, wherein the PID comprises a notification vector, NV, and a notification destination, NDST, and modifying the NDST of the PID of the processing circuitry (34) to redirect interrupts addressed to the processing circuitry.

Another example (e.g. example 23) relates to a previously described example (e.g. example 18-22), further comprising associating a different notification vector to the processing circuitry (34) and the surrogate processing circuitry to redirect all interrupts addressed to the processing circuitry to the surrogate processing circuitry.

Another example (e.g. example 24) relates to a previously described example (e.g. example 18-23), further comprising adding a passthrough-mode to the PID to establish and/or end the redirection of interrupts addressed to the processing circuitry (34) to the surrogate processing circuitry.

Another example (e.g. example 25) relates to a computer program having a program code for performing the method according to a previously described example (e.g. example 18-24), when the computer program is executed on a computer, a processor, or a programmable hardware component.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A processing device, comprising:
an interface configured to receive information about an operation state of a surrogate processing circuitry; and
processing circuitry configured to control the interface and to decide whether an interrupt addressed to the processing circuitry is processed by the processing circuitry or redirected to the surrogate processing circuitry based on an operation state of the processing circuitry and the surrogate processing circuitry, wherein the processing circuitry is further configured to track a rate of interrupts addressed to the processing circuitry and to end the redirection in dependency of the rate of interrupts.

2. The processing device according to claim 1, further comprising observing circuitry configured to:
   observe the operation state of the processing circuitry and/or the surrogate processing circuitry; and
   transmit information about the observed operation state to the processing device.

3. The processing device according to claim 1, wherein information about the observed operation state is transmitted by storing it in a model-specific register and/or a local vector table accessible by the processing device.

4. The processing device according to claim 1, wherein the processing circuitry is further configured to establish a redirection of any interrupt addressed to the processing circuitry to the surrogate processing circuitry for a defined time.

5. The processing device according to claim 1, wherein the processing circuitry is further configured to manage a minimum number of at least two surrogate processing circuitries as targets for redirecting an interrupt.

6. The processing device according to claim 1, wherein the processing circuitry is further configured to change the minimum number of surrogate processing circuitries by adding a surrogate processing circuitry to the minimum number and/or by removing a surrogate processing circuitry.

7. The processing device according to claim 1, wherein the processing circuitry is further configured to transmit information of an established redirection of any interrupts addressed to the processing circuitry to improve a power-saving mode of the processing circuitry.

8. The processing device according to claim 1, wherein the processing circuitry is further configured to:
   allocate a posted interrupt descriptor, PID, for the processing circuitry and the surrogate processing circuitry, wherein the PID comprises a notification vector, NV, and a notification destination, NDST, and
   modify the NDST of the PID of the processing circuitry to redirect interrupts addressed to the processing circuitry.

9. The processing device according to claim 8, wherein the processing circuitry is further configured to associate a different notification vector to the processing circuitry and the surrogate processing circuitry to redirect all interrupts addressed to the processing circuitry to the surrogate processing circuitry.

10. The processing device according to claim 8, wherein the processing circuitry is further configured to manage a list of PIDs to redirect specific interrupts of the processing circuitry to the surrogate processing circuitry.

11. The processing device according to claim 8, wherein the processing circuitry is further configured to add a passthrough-mode to the PID to establish and/or end the redirection of interrupts addressed to the processing circuitry to the surrogate processing circuitry.

12. The processing device according to claim 11, wherein the passthrough-mode is added by setting a passthrough bit in the PID and wherein establishing and/or ending the redirection is performed by flipping the bit.

13. An electronic device comprising the processing device according to claim 1, wherein the electronic device is a personal computer and/or cloud computing.

14. A control unit, comprising:
   an interface configured to communicate with a processing circuitry and a surrogate processing circuitry; and
   processing unit configured to control the interface and to redirect an interrupt addressed to the processing circuitry to the surrogate processing circuitry, based on operation state of the processing circuitry and the surrogate processing circuitry, wherein the processing unit is further configured to track a rate of interrupts addressed to the processing circuitry and to end the redirection in dependency of the rate of interrupts.

15. The control unit according to claim 14, further comprising observing circuitry configured to:
   observe the operation state of the processing circuitry and/or the surrogate processing circuitry; and
   transmit information about the observed operation state to the control unit.

16. The control unit according to claim 14, wherein information about the observed operation state is transmitted by storing it in a model-specific register and/or a local vector table accessible by the control unit.

17. The control unit according to claim 14, wherein the processing unit is further configured to establish a redirection of any interrupt addressed to the processing circuitry to the surrogate processing circuitry for a defined time.

18. The control unit according to claim 14, wherein the processing unit is further configured to scan all interrupts of the processing device to redirect every interrupt addressed to the processing circuitry to the surrogate processing circuitry.

19. A method, comprising:
   receiving an interrupt addressed to a processing circuitry;
   deciding whether the interrupt addressed to the processing circuitry is processed by the processing circuitry or redirected to a surrogate processing circuitry based on an operation state of the processing circuitry and the surrogate processing circuitry; and
   tracking a rate of interrupts addressed to the processing circuitry and ending the redirection in dependency of the rate of interrupts.

20. The method according to claim 19, further comprising observing an operation state of the processing circuitry and/or the surrogate processing circuitry; and
   transmitting information about the observed operation state to the control unit and/or the processing device.

21. A non-transitory, computer-readable medium comprising a program code that, when the program code is executed on a computer, a processor, or a programmable hardware component, performs a method according to claim 19.

* * * * *